United States Patent [19]

Coffin et al.

[11] Patent Number: 5,768,647
[45] Date of Patent: Jun. 16, 1998

[54] CAMERA POSITIONING ASSEMBLY

[75] Inventors: Jeffrey S. Coffin, Sykesville, Md.; Jack Goodman, Arlington, Va.

[73] Assignee: Technology Recognition Systems, Inc., Alexandria, Va.

[21] Appl. No.: 759,700

[22] Filed: Dec. 6, 1996

[51] Int. Cl.$^6$ .................................................. G03B 17/00
[52] U.S. Cl. ........................... 396/428; 396/427; 348/373; 352/243
[58] Field of Search ................. 396/419, 427, 396/428, 329; 352/243, 53; 348/373, 143

[56] References Cited

U.S. PATENT DOCUMENTS

| | | | |
|---|---|---|---|
| 3,239,601 | 3/1966 | Keys | 348/373 |
| 3,437,753 | 4/1969 | Stith | 348/373 |
| 3,491,201 | 1/1970 | Tyler | 348/373 |
| 4,040,592 | 8/1977 | Jones | 248/460 |
| 4,699,149 | 10/1987 | Rice | |
| 5,163,094 | 11/1992 | Prokoski et al. | |
| 5,652,849 | 7/1997 | Conway et al. | 395/327 |

OTHER PUBLICATIONS

Jeffrey M. Gilbert and and Woodward Yang, "A Real–Time Face Recognition System Using Custom VLSI Hardware."
Baback Moghaddam and Alex Pentland, "Face Recognition Using View–Based and Modular Eigenspaces," (1994).

*Primary Examiner*—A. A. Mathews
*Attorney, Agent, or Firm*—Dickstein Shapiro Morin & Oshinsky LLP

[57] ABSTRACT

A camera positioning assembly including a backing board, a base member connected to said backing board about an axis, a gear adapted for rotational movement, an arm connected to said gear and said base member for moving said base member about said axis in order that rotational movement of said gear is translated into rotational movement of said base member and a servo-controller that controls the rotational movement of said gear.

6 Claims, 5 Drawing Sheets

CAMERA POSITIONING ASSEMBLY

BACKGROUND OF THE INVENTION

1. Field of Invention

The present invention relates to an assembly for positioning a camera. Specifically, the present invention relates to an assembly that can automatically return a camera to a known position.

2. Description of Related Art

Security systems may include cameras that obtain the facial image of a person in order to ascertain identification. For example, when facial thermograms are used as part of a security system, a camera is required to obtain the original image of the person and to obtain subsequent images of the person that are compared to the original image. In obtaining the original image (hereinafter referred to as the "enrollment mode"), an operator is needed to position the camera to obtain the best image possible of the subject. When the subject attempts to enter a secured area, the camera must read his facial image again (hereinafter referred to as the "access mode"). In the access mode, the camera must be positioned in substantially the same spot as it was during the enrollment mode so that the subsequent image obtained can be compared with the original image. Conventional security systems use an operator to position the camera for a subsequent reading by directing the camera's movement like in the enrollment mode. However, using an operator for this purpose is costly and slow. Thus, there is, a need for a positioning assembly that can be operated both manually and automatically.

SUMMARY OF THE INVENTION

The disadvantages of the prior art are overcome to a great extent by the present invention, which provides an assembly capable of both automatic and manual operation.

It is an object of the present invention to provide a camera positioning assembly that can be operated both manually and automatically.

It is a further object of the invention to provide a camera positioning assembly that is capable of sensing and remembering a home position.

It is another object of the invention to provide a camera positioning assembly that is capable of sensing its position based on its relative distance from its home position.

It is an object of the invention to provide a camera positioning assembly that is light-weight and inexpensive to manufacture.

It is a further object of the invention to provide a camera positioning assembly that does not lock up even when the motor malfunctions and rotates continuously.

It is another object of the invention to provide a camera positioning assembly including a constant tension spring that acts as a counter-weight.

Other objects, features and advantages of the present invention will become apparent from the following detailed description and drawings of the preferred embodiments of the present invention.

Briefly described, the invention comprises a camera positioning assembly including a backing board, a base member connected to the backing board about an axis, a first gear connected to a motor, a second gear adapted for rotational movement and coupled to the first gear, and an arm connected to both the second gear and the base member for moving said base member about said axis in order that rotational movement of said second gear is translated into rotational movement of said base member. A spring having a first end and a second end connects the base member to the backing board and counter-balances the weight of the camera. The spring is attached at its first end to a spring spool, which is attached to the backing board. The spring is wound about the spring spool. A spring keeper is attached to the base member and the second end of the spring. A servo-controller including a microprocessor, a motor that receives signals from the microprocessor, an amplifier for supplying voltage to the motor, and an optical encoder, which measures the position of the second gear relative to a home position, positions the base member based at least on input from the optical encoder.

DESCRIPTION OF PREFERRED EMBODIMENTS

Figure 1:
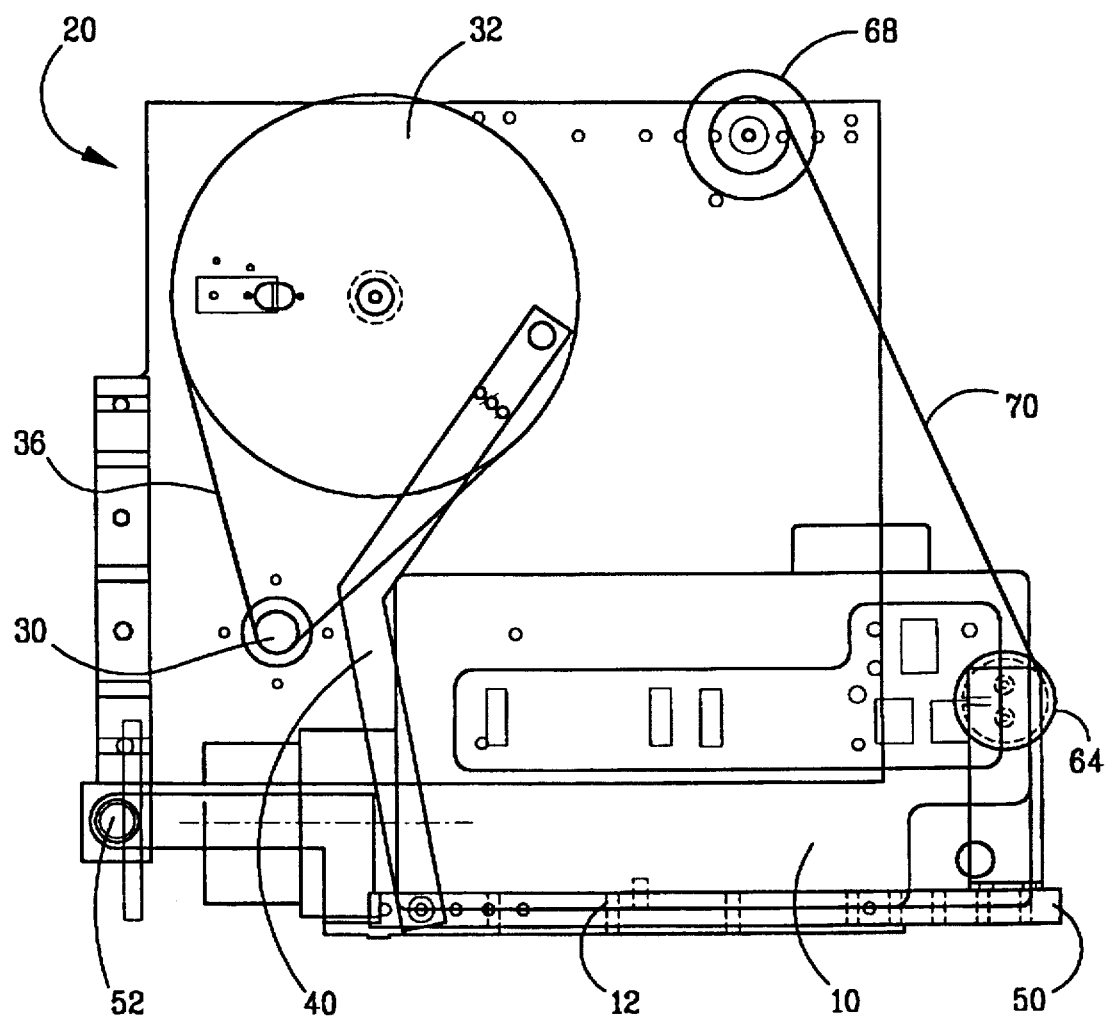
FIG. 1 is side view of a preferred embodiment of a camera positioning assembly and camera constructed in accordance with the present invention.
Figure 2:
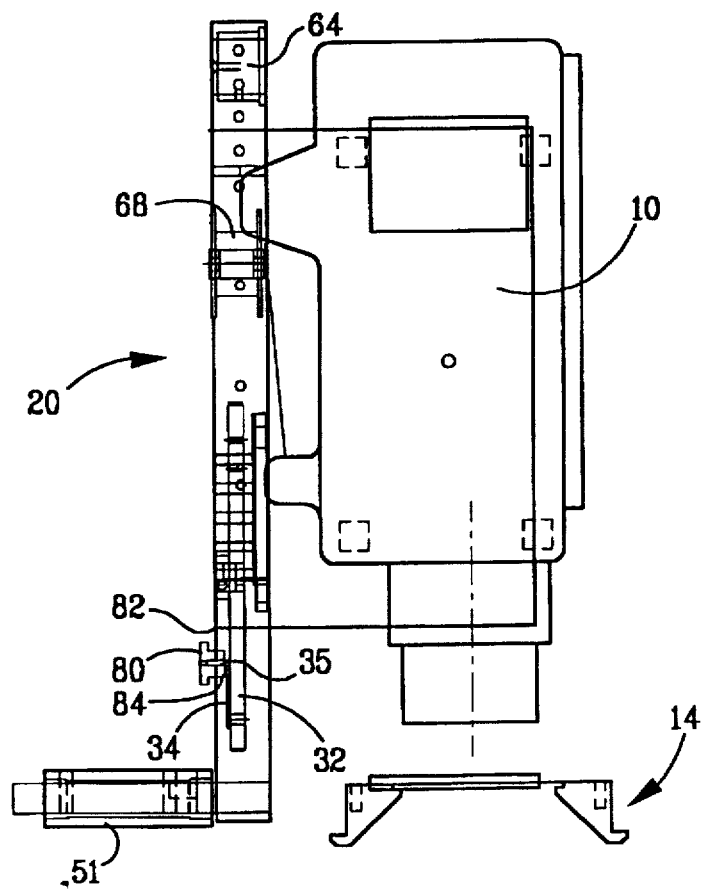
FIG. 2 is a top view of the assembly and camera of FIG. 1.
Figure 3:
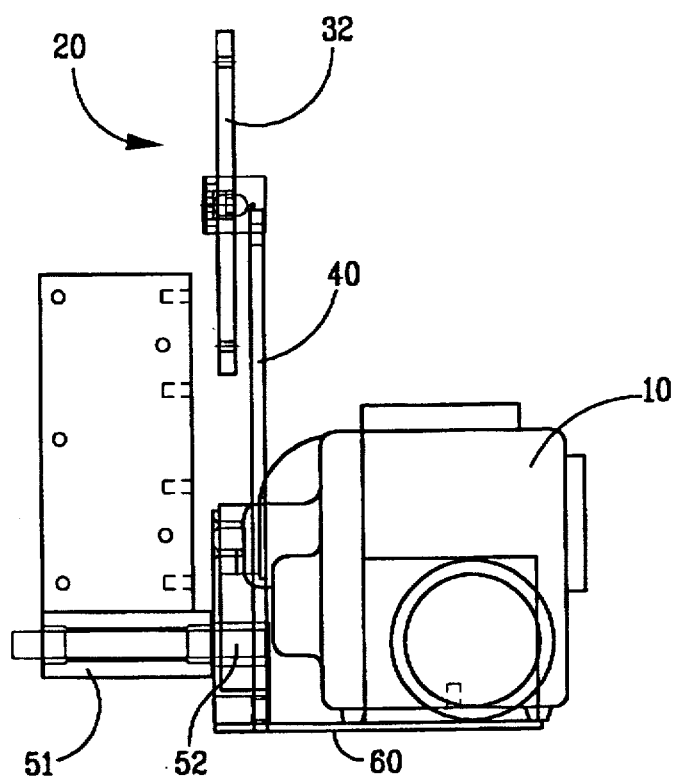
FIG. 3 is a front view of the assembly and camera of FIG. 1.

Referring now to the drawings, where like parts are designated by like reference numbers throughout, there is shown in FIGS. 1–3 a camera positioning assembly 20 and camera 10 constructed according to the present invention. The camera 10 is fastened to the assembly 20 with a screw 12. The camera 10 and the assembly 20 are housed by a casing (not shown). The camera 10 is directed towards an opening in the face plate 14 (FIG. 2) of the casing (not shown) so that it may view subject images.

Figure 4:
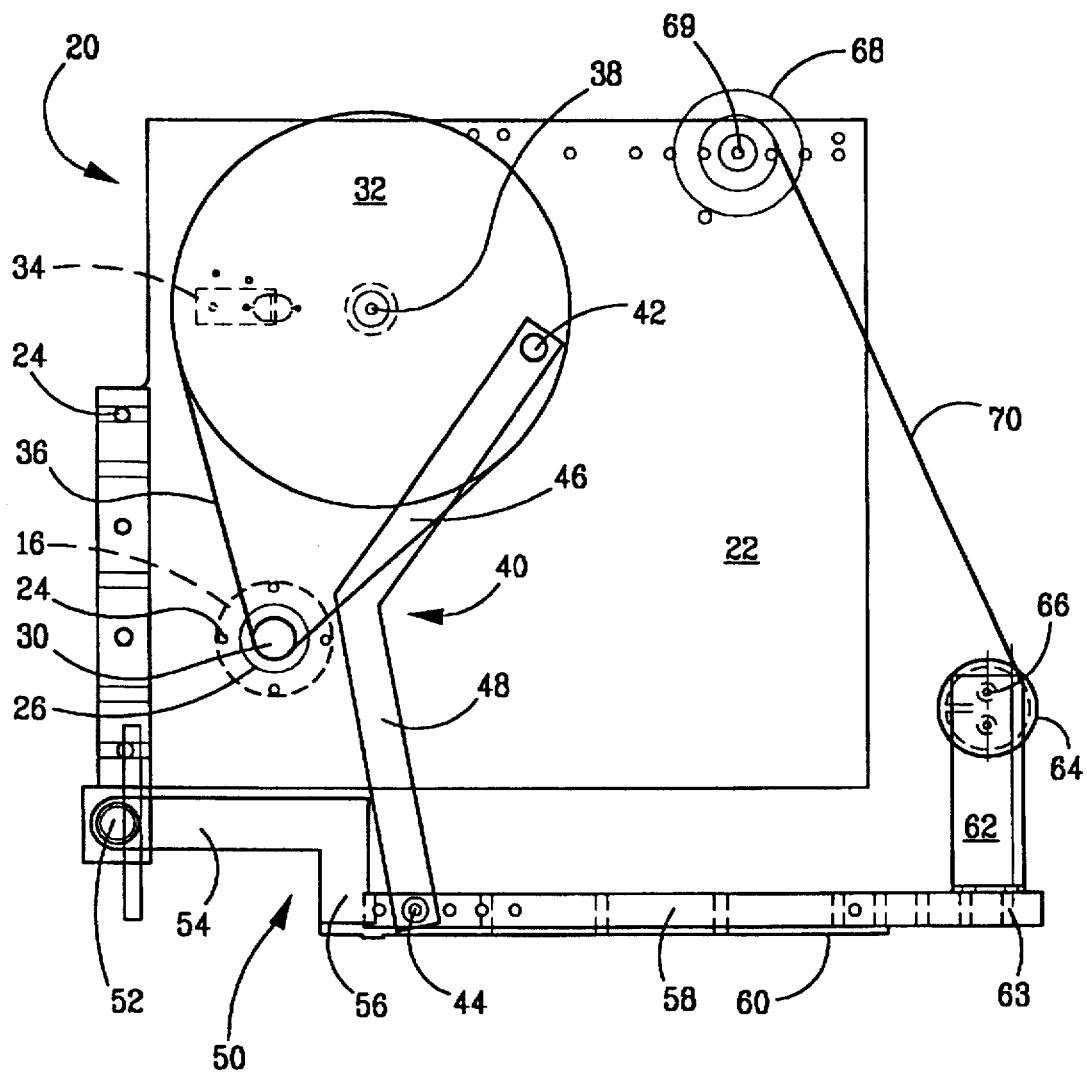
FIG. 4 is a side view of the assembly of FIG. 1 without the camera.

FIG. 4 shows the positioning assembly 20 without the camera 10. A backing board 22, which is fastened to the casing (not shown) with screws 24, supports many of the components of the assembly 20. A hole 26 is formed in the backing board 22 to accommodate a drive gear 30. The drive gear 30 is rotatably connected to a servo motor 16 attached to the opposite side of the backing board 22. The drive gear 30 is coupled to the operating gear 32 by a chain 36. It is preferred that the gear ratio of the operating gear 32 to the drive gear 30 is 7:1 so that the assembly can be manufactured using off-the-shelf parts. Other gear ratios would be acceptable. The operating gear 32 is rotatably connected to the backing board 22 with a shaft 38 and bearings. As seen in FIGS. 2 and 4, an L-shaped flag 34 is attached to the operating gear 32. The flag 34 includes a trip portion 35 (FIG. 2), which is perpendicular to the operating gear 32. The flag 34 defines a reference point on the operating gear 32. An optical sensor 80 is embedded within the backing board 22. The sensor 80 and the flag 34 are used to define a known position of operating gear 32 during synchronization of the assembly, as described more fully below. The sensor 80 includes two leads 82 and 84 extending from the backing board 22 between which an infrared (IR) beam travels. The sensor 80 sends a signal to a controller 100 (FIG. 6) when the IR beam is broken. The IR sensor offers the advantage of avoiding false tripping caused by light leaks or reflection from internal parts of the assembly 20. The trip portion 35 of the flag 34 is arranged to travel between the two leads 82 and 84 as the operating gear 32 rotates.

Figure 5:
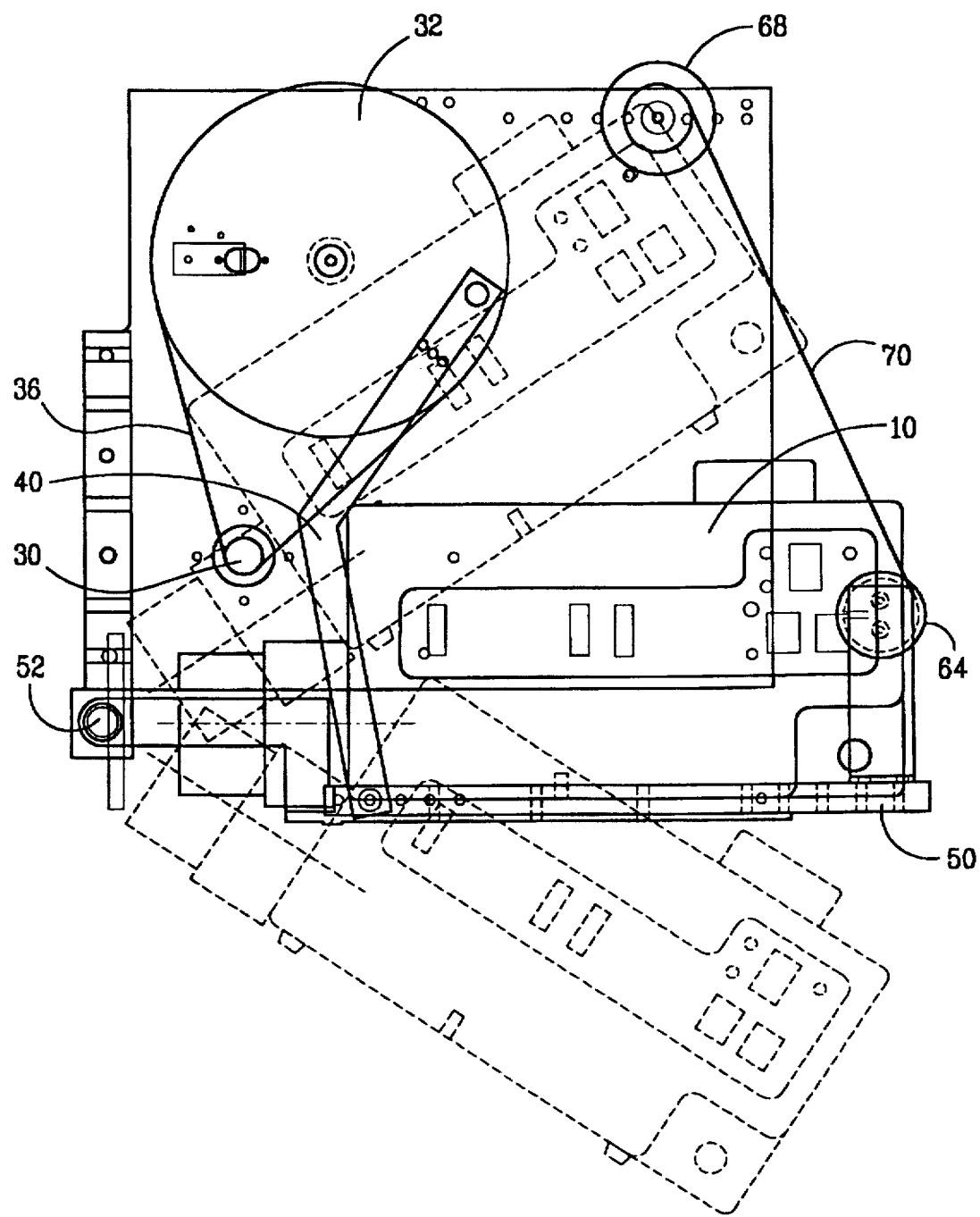
FIG. 5 is a side view of the assembly of FIG. 1 showing the range of motion of the camera.

An arm 40 is fastened to the operating gear 32 with a screw 42. The arm 40 has a first linear portion 46, which is fixedly attached to the operating gear 32. The arm 40 also includes a second linear portion 48 that is integral with the first portion 46. The first portion 46 and the second portion 48 form approximately a one hundred and twenty-five degree angle. The second portion 48 is fixedly attached to a base member 50 with a screw 44. The base member 50 includes three integral portions: a first base portion 54, a second base portion 56, and a third base portion 58. The first and third base portions 54 and 58 are parallel to one another and are connected by the second base portion 56. The second base portion 56 is perpendicular to each of the first and third base portions 54 and 58. A base plate 60 is attached to the base member 50 such that the base plate 60 is perpendicular to the base member 50. The base member 50 and the base plate 60 support the camera 10 (FIGS. 1 and 3). The base member 50 connects to a pin 52 housed within a bearing plate 51, which is bolted to the backing board 22. The pin 52 is located at the free end of the first portion 54 and travels completely through the bearing plate 51 and backing board 22 to improve stability. The base member 50 rotates about the pin 52 and thereby changes the position of the camera 10, as shown in FIG. 5. A clamp (not shown) may secure the camera wire (not shown) to the base plate 60 to raise the center of gravity of the camera 10 so that the base member 50, base plate 60, and camera 10 pivot more freely about the pin 52.

A spring bracket 62 is fastened at one end to the third portion 58 with a plurality of screws 63. The spring bracket 62 is perpendicular to the third portion 58 of the base member 50. A spring keeper 64 is fixedly attached to the opposite end of the spring bracket 62 with a plurality of screws 66. A spring 70 is attached at one of its ends to the spring keeper 64. The spring 70 is selected with a spring coefficient that is sufficient to exert a force equal to the weight of the camera 10 so that the system is balanced. As a result, the servo motor 16 need supply only enough force to overcome the inertia of the system. Thus, a smaller, less expensive motor 16 may be used. Furthermore, a spring 70 is preferable to a counter-weight because the counter-weight would make the entire assembly 20 heavier and take up more space in the casing. In a preferred embodiment, the spring 70 is a six-pound constant tension spring. The spring 70 is attached at its other end to a spring spool 68, which is fixedly attached to the backing board 22 with a fastener 69. The spring 70 wraps around the spring spool 68 when the base member 50 is raised upward towards the spring spool 68. The spring 70 is in its least extended position when the operating gear 32 and arm 40 combination is at top dead center, i.e., when the screw 42 is directly above the center of the operating gear 32. The spring 70 is in its most extended position when the operating gear 32 and arm 40 combination is at bottom dead center, i.e., when the screw 42 is directly below the center of the operating gear 32. FIG. 1 shows the operating gear 32 and arm 40 combination in a position between top and bottom dead center.

Figure 6:
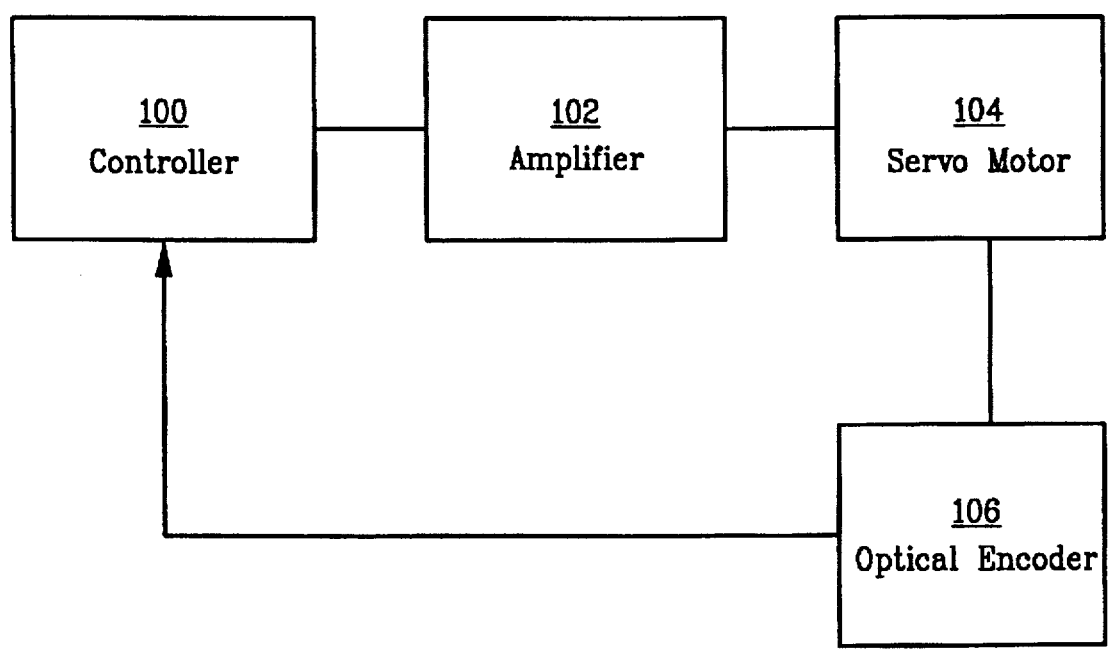
FIG. 6 is a block diagram of a preferred embodiment of a servo-control mechanism used to control the assembly of FIG. 1.

Referring now to FIG. 6, the servo-control mechanism includes a controller 100, such as a microprocessor, an amplifier 102, a servo motor 104, and an optical encoder 106. The controller 100 receives commands from a main computer (not shown), such as a personal computer. The amplifier 102, servo motor 104, and optical encoder 106 also send input to the controller 100. To move the positioning assembly 20, the controller 100 signals the amplifier 102, which sends voltage to the servo motor 104. The speed of the servo motor 104, and therefore, the speed of the movement of the camera 10, may vary. As the operating gear 32 rotates, the optical encoder 106 measures the position of the operating gear 32 as a function of a number of counts from a "home" position. The encoder 106 feeds this information to the controller 100. A preferred optical encoder is a 1000 count encoder. Thus, because the gear ratio is 7:1, there are 7000 counts per 360 degrees. Based on the input from the encoder 106, the controller 100 knows the position of the operating gear 32 and can activate the motor 104 to position the camera 10 in the appropriate place.

During operation, the servo motor 16 turns the drive gear 30, which turns the operating gear 32 because they are coupled by the chain 36. As the operating gear 32 rotates, it moves the arm 40 vertically up or down. Since the arm 40 is connected to the base member 50, which supports the camera 10, the base member 50 is also moved up and down. However, because the base member 50 is attached to the backing board 22 at the pin 52, the base member 50 pivots about the pin 52. The camera 10 is, therefore, able to tilt upward and downward, as shown in FIG. 5. The length and configuration of the arm 40 is designed to allow the servo motor 16 to rotate in only one direction to move the base member 50 up and down. If the arm were designed such that the base member 50, arm 40 and operating gear 32 locked up, or were prevented from further movement, once the operating gear 32 stated a certain number of degrees, a two way motor would be required. Furthermore, the motor would be susceptible to burn out if the motor continued to turn while the system was locked up. With the present design, however, if the servo motor 16 malfunctions and rotates continuously, the base member 50 simply continues to move up and down and does not cause the servo motor 16 to burn out.

In either the enrollment or access mode, first the assembly 20 is synchronized. During synchronization, the gears 30 and 32 rotate until the flag 34 interrupts the beam emitted by the optical sensor 80, at which point the gears 30 and 32 stop. The encoder 106 sends a signal to the controller 100 to mark this position as "home." This position is defined as "zero counts" in the optical encoder 106. As the operating gear 32 subsequently rotates away from the "home" position in either the enrollment or the access mode, the encoder 106 measures the position of the operating gear 32 in counts.

In the enrollment mode, the operator inputs personal identification data about the subject, such as a personal identification number (PIN) and the subject's name. The operator then positions the camera 10 by instructing the camera 10 through the main computer (not shown), which commands the controller 100 to move up or down such that the subject's face is centered within the camera frame. Once the operator decides that the subject's facial image is appropriate, he instructs the main computer to save the image. The controller 100 reads the position of the camera 10 from the optical encoder 106 as a number of counts from the "home" position. The position data is stored in association with the personal identification data.

In the automated access mode, the subject approaches the camera and enters his PIN or other personal identification data. The subject must position himself in the appropriate place, as indicated by the security system. The main computer retrieves the camera position data, as a number of counts from "home." The operating gear 32 is then rotated directly to that position. Before moving to the stored position, the operating gear 32 does not have to return to the "home" position. Since all positions are measured from the "home" position, the controller 100 is able to calculate the number of degrees to rotate the operating gear 32 in order to move it from its present position to the position stored in connection with a particular subject. Once the camera 10 is in the stored position, it reads another facial image. As long as the subject is located in the indicated position, his image will be captured. The main computer compares the newly captured image with the stored image to determine if the present subject is the same as the enrolled subject. The camera 10 may move more rapidly in the access mode than in the enrollment mode because the final position is known. This quicker speed reduces the amount of time that a subject must wait to gain access to a secured area.

The above description and drawings are only illustrative of preferred embodiments of the present invention, and are not intended to limit the present invention thereto. Any modification of the present invention which comes within the spirit and scope of the following claims is to be considered part of the present invention.

What is claimed is:

1. A camera positioning assembly comprising:
   a backing board;
   a base member connected to said backing board about an axis;
   a gear adapted for rotational movement;
   an arm connected to said gear and said base member for moving said base member about said axis in order that rotational movement of said gear is translated into rotational movement of said base member;
   a servo-controller that controls the rotational movement of said gear;
   an optical sensor attached to said backing board which indicates its activation to said servo-controller; and
   a flag member attached to said gear and arranged to activate said optical sensor when said gear is in a first position.

2. The camera positioning assembly of claim 1 further comprising an optical encoder, said servo-controller being adapted to set said optical encoder to zero when said gear is in said first position, and said optical encoder being adapted to measure a distance that said gear rotates from said first position.

3. A camera positioning assembly comprising:
   a backing board;
   a base member connected to said backing board about an axis;
   a gear adapted for rotational movement;
   an arm connected to said gear and said base member for moving said base member about said axis in order that rotational movement of said gear is translated into rotational movement of said base member;
   a servo-controller that controls the rotational movement of said gear; and
   a spring connecting said base member to said backing board for counter-balancing the weight of a camera.

4. The camera positioning assembly of claim 3 wherein said spring comprises a constant tension spring.

5. A camera positioning assembly comprising:
   a backing board;
   a base member connected to said backing board about an axis;
   a gear adapted for rotational movement;
   an arm connected to said gear and said base member for moving said base member about said axis in order that rotational movement of said gear is translated into rotational movement of said base member; and
   a servo-controller that controls the rotational movement of said gear;
   wherein said arm includes a first part that is attached to said gear and a second part that is attached to said base member, and wherein said first part makes approximately a one hundred and twenty-five degree angle with said second part.

6. A camera positioning assembly comprising:
   a backing board;
   a base member connected to said backing board about an axis;
   a first gear connected to a motor;
   a second gear adapted for rotational movement and coupled to said first gear;
   an arm connected to said second gear and said base member for moving said base member about said axis in order that rotational movement of said second gear is translated into rotational movement of said base member;
   a spring having a first end and a second end connecting said base member to said backing board;
   a spring spool attached to said backing board to which said spring is attached at said first end and about which said spring is wound;
   a spring keeper attached to said base member and said second end of said spring; and
   a servo-controller including a microprocessor, a motor that receives signals from said microprocessor, an amplifier for supplying voltage to said motor, and an optical encoder for measuring a position of said second gear relative to a home position;
   wherein said servo-controller positions said base member based at least on input from said optical encoder.

* * * * *